J. W. JOACHIM.
GAGE.
APPLICATION FILED JULY 29, 1916.
1,228,325.
Patented May 29, 1917.
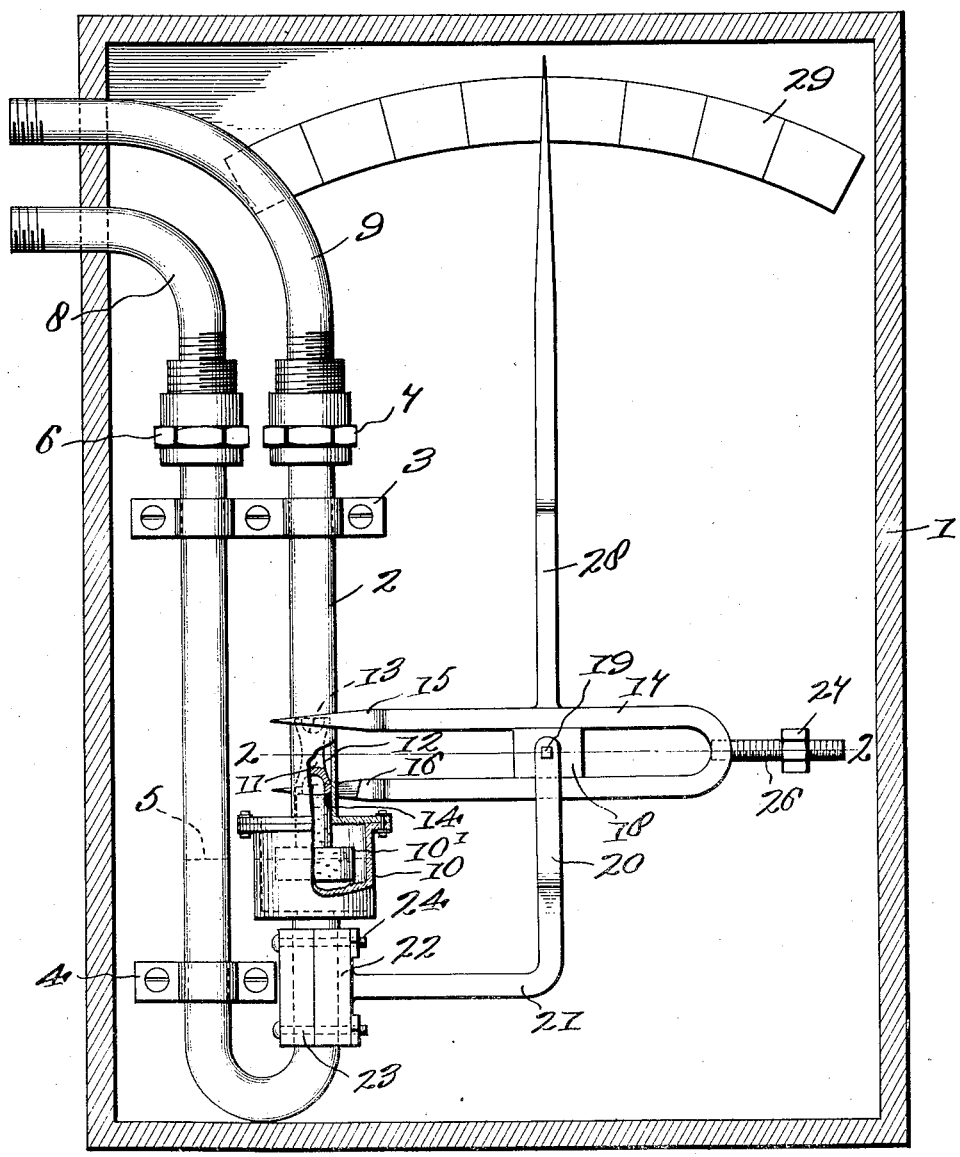
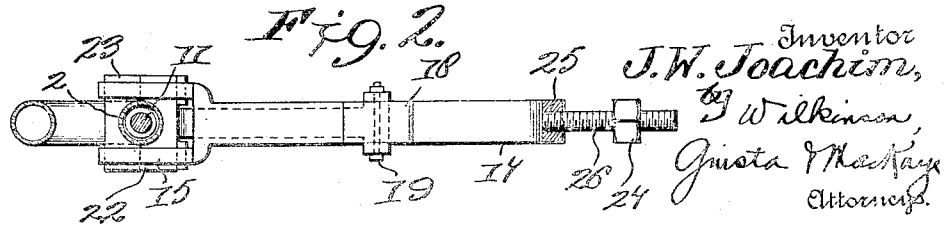
Inventor
J. W. Joachim,
by Wilkinson,
Guista & MacKaye
Attorneys.

UNITED STATES PATENT OFFICE.

JOSEPH WENDELIN JOACHIM, OF NEW ORLEANS, LOUISIANA.

GAGE.

1,228,325.  Specification of Letters Patent.  Patented May 29, 1917.

Application filed July 29, 1916. Serial No. 112,144.

*To all whom it may concern:*

Be it known that I, JOSEPH W. JOACHIM, a citizen of the United States, residing at New Orleans, in the parish of Orleans and State of Louisiana, have invented certain new and useful Improvements in Gages; and I do hereby declare the following to be a full, clear, and exact description of the invention, such as will enable others skilled in the art to which it appertains to make and use the same.

The present invention relates to improvements in gages, and has for an object to provide an improved gage which, while more adaptable for indicating the draft in boiler furnaces, may have other applications, as, for instance, in registering variations in pressure.

In the embodiment herein shown and described, the invention consists in a magnetic body supported on a float or other device responsive to variations in pressure or the rise and fall of a liquid column, and a magnetized lever, under the influence of said magnetic body, and carrying a pointer movable over a scale, such body and lever being of improved construction, all as hereinafter more fully described.

In the accompanying drawings forming a part of this application, and in which similar reference symbols indicate corresponding parts in the several views:

Figure 1 is a vertical sectional view through a casing, showing partly in elevation and partly in section the improved gage as constructed in accordance with the present invention; and Fig. 2 is a sectional view taken on the line 2—2 in Fig. 1.

Referring more particularly to the drawings, 1 designates a casing in which is fitted a U-shaped tube 2, of glass, brass, or other non-magnetic material; it being held therein, in an upright position, as by the straps 3 and 4. This U-shaped tube 2 is adapted to contain a fluid, preferably water or oil, and to a proper height, which may be that indicated at 5 in Fig. 1.

The upper open ends of the tube 2 are connected by stuffing boxes 6 and 7 with pipes 8 and 9 passing through the casing 1, and placing said tube in communication with a boiler furnace or other device wherein variations are to be indicated.

In one branch of the tube 2 is a float chamber 10 containing a float 10' for riding up and down therein as impelled by the motion of the liquid column. A magnetic body 11 is supported on the float 10', and may, if desired, be secured thereto in any suitable manner. Such magnetic body is preferably of the form shown in the drawings, it being illustrated as of spool-configuration, turned down on its sides, as indicated at 12, and having recesses 13 in its ends, leaving flanges 14 on which the magnetism is concentrated by virtue of the shape given to the body 12.

The bifurcated ends or pole pieces 15 and 16 of a lever 17, bent to form a horseshoe magnet, embrace that branch of the tube 2 in which is located the magnetic body 11, such bifurcated ends being disposed opposite unlike poles on said magnetic body, whereby the lever 17 will be attracted and oscillated as the magnetic body rises and falls with the float 10' in response to variations in the liquid level in the tube 2.

A block 18, of non-magnetic material, is placed between the arms of the lever 17, and is perforated centrally to receive a pin or pivot 19, also passing through bifurcated arms 20 upon a bracket 21. The bracket 21 is secured to one member 22 of a clamp, the companion member 23 thereof being secured thereto and about the tube 2 by bolts or other means 24.

The yoke of the magnet 17 is provided with a threaded opening 25, as shown in Fig. 2, for receiving a threaded rod 26 on which is run a counterbalancing nut 27. Minute adjustment may be had by rotating the nut 27 on the threaded rod 26, such as is necessary to accuracy in an instrument of this character.

An index or pointer 28 is provided on the lever 17, preferably centrally thereof, and disposed with its longitudinal center coinciding with the pin 19 on which the lever rocks. The pointer moves over a scale 29 in the casing 1, and there indicates the variations in the boiler furnace, or other device, to which the instrument is attached.

The operation of the invention may be concisely described as follows:

The liquid 5 in the tube 2, in responding to variations in the boiler furnace or other device, will carry therewith the float 10' and magnetic body 11. As the body 11 changes its position it will attract the pole pieces 15 and 16, thereby oscillating the lever 17 about the fulcrum pin 19 and transmitting movement to the index 28, which latter, moving over the scale 29, will indicate a change in pressure or liquid level in the boiler or furnace, and the degree thereof.

It is obvious that those skilled in the art may vary the details of construction and arrangements of parts without departing from the spirit of my invention, and therefore I do not wish to be limited to such features except as may be required by the claims.

I claim:

1. In an improved gage, a magnetic body having recessed ends, means for causing said magnetic body to move in response to the variations to be indicated, and an indicating device under the magnetic influence of said body and operable thereby, substantially as described.

2. In an improved gage, a magnetic body having a reduced central portion and enlarged ends whereon the magnetism is concentrated, means for causing said magnetic body to move in response to the variations to be indicated, and an indicating device under the magnetic influence of said body and movable with the latter, substantially as described.

3. In an improved gage, a magnetic body having a reduced central portion and enlarged recessed ends with flanges surrounding the recesses, means for causing said magnetic body to move in response to the variations to be indicated, and an indicating device under the magnetic influence of said body and movable with the latter, substantially as described.

4. An improved gage including a tube for containing a fluid, a device therein movable in response to fluid variations, a magnetic body shiftable with said device, a U-shaped lever having bifurcated ends embracing said tube and disposed one opposite each of the magnetic poles of said body, and an indicating device operated from said lever, substantially as described.

5. In an improved gage of the character described, the combination of a magnetic body having recessed ends, means for causing said body to respond to the variations to be indicated, a magnetized lever having its ends disposed opposite said body, and an indicating device associated with said lever, substantially as described.

6. In an improved gage, the combination of a magnetic body having recessed ends and sides, means for causing said body to respond to the variations to be indicated, a magnetized lever having bifurcated polarized ends embracing said body and adapted to be oscillated thereby, means for adjustably counterbalancing said lever, a scale, and a pointer on said lever moving over said scale, substantially as described.

In testimony whereof, I affix my signature.

JOSEPH WENDELIN JOACHIM.